United States Patent
Tosas Fuentes et al.

(10) Patent No.: US 12,460,352 B2
(45) Date of Patent: Nov. 4, 2025

(54) FILTER PAPER FOR CIGARETTE FILTERS AND FILTER COMPRISING IT

(71) Applicant: MIQUEL Y COSTAS & MIQUEL, S.A., Barcelona (ES)

(72) Inventors: Agustín Tosas Fuentes, Barcelona (ES); Mónica Ferreró Aragonés, Barcelona (ES); Marcel Alemany Munné, Barcelona (ES); Pablo De Mariscal Ruigómez, Barcelona (ES)

(73) Assignee: MIQUEL Y COSTAS & MIQUEL, S.A., Barcelona (ES)

(*) Notice: Subject to any disclaimer, the term of this patent is extended or adjusted under 35 U.S.C. 154(b) by 363 days.

(21) Appl. No.: 18/223,104

(22) Filed: Jul. 18, 2023

(65) Prior Publication Data

US 2024/0026609 A1    Jan. 25, 2024

(30) Foreign Application Priority Data

Jul. 19, 2022   (ES) ................ ES202230664

(51) Int. Cl.
| | |
|---|---|
| *D21H 15/06* | (2006.01) |
| *A24D 3/06* | (2006.01) |
| *A24D 3/10* | (2006.01) |
| *D21H 17/26* | (2006.01) |
| *D21H 27/08* | (2006.01) |

(52) U.S. Cl.
CPC .......... *D21H 15/06* (2013.01); *A24D 3/063* (2013.01); *A24D 3/10* (2013.01); *D21H 17/26* (2013.01); *D21H 27/08* (2013.01)

(58) Field of Classification Search
CPC ........ D21H 15/06; D21H 17/26; D21H 27/08; A24D 3/10
USPC ......................................... 162/176
See application file for complete search history.

(56) References Cited

U.S. PATENT DOCUMENTS

| | | |
|---|---|---|
| 5,671,757 A | 9/1997 | Woodings |
| 11,083,217 B2 | 8/2021 | Bachmann et al. |
| 2014/0137880 A1* | 5/2014 | Zitturi ............. D21H 27/08 131/365 |
| 2015/0059789 A1 | 3/2015 | Mccormack et al. |
| 2015/0173414 A1 | 6/2015 | Bachmann et al. |
| 2021/0378290 A1 | 12/2021 | Ademe et al. |
| 2022/0079216 A1 | 3/2022 | Cherkas et al. |

FOREIGN PATENT DOCUMENTS

| | | |
|---|---|---|
| CN | 101243901 A | 8/2008 |
| CN | 102326865 A | 1/2012 |
| GB | 1019984 | 2/1966 |
| GB | 2075328 A | 11/1981 |
| GB | 2525363 A | 10/2015 |

OTHER PUBLICATIONS

Joly et al., "Comparison of cellulose vs. plastic cigarette filter decomposition under distinct disposal environments", Waste Management, 2018, p. 2.

* cited by examiner

*Primary Examiner* — Jacob T Minskey
(74) *Attorney, Agent, or Firm* — The Webb Law Firm

(57) ABSTRACT

The object of the invention is a filter paper characterized in that it includes between 70% and 100% by weight of cellulose fibers, wherein between 50% and 75% by weight of the fibers are long fibers, understanding by this fibers that have an average length greater than 2 mm, and between 25% and 50% by weight of the fibers are short fibers, understanding by this fibers that have an average length of less than 2 mm; between 0.1% and 5.0% by weight of sodium carboxymethyl cellulose; and wherein the weight of the filter paper per unit area is between 25 and 55 g/m$^2$, measured according to UNE-EN ISO 536:2013 standard; the density thereof varies between 0.100 and 0.500 g/cm$^3$, measured according to UNE-EN ISO 534:2012 standard in a single sheet; and the porosity of the filter paper is between 1500 and 8500 ml/min·cm$^2$·kPa, measured according to UNE-EN ISO 2965:2019 standard. The paper filter including said filter paper is also an object of the invention.

3 Claims, No Drawings

FILTER PAPER FOR CIGARETTE FILTERS AND FILTER COMPRISING IT

CROSS-REFERENCE TO RELATED APPLICATION

This application claims priority to Spanish Patent Application No. P202230664 filed Jul. 19, 2022, the disclosure of which is hereby incorporated by reference in its entirety.

BACKGROUND OF THE INVENTION

Field of the Invention

The present invention belongs to the field of the paper industry. In particular, it relates to a new cigarette filter paper, as well as to the filter that comprises the same.

Description of Related Art

A study recently published in the journal Waste Management (Joly, Frangois-Xavier and Coulis, Mathieu (2018), "*Comparison of cellulose vs. plastic cigarette filter decomposition under distinct disposal environments*", Waste Management, 72, 349-353) addresses the problem associated with the amount of cigarette butts discarded annually throughout the world, which amounts to approximately 4.5 trillion. The study also points out that to accelerate the disappearance of this type of waste, a new type of cigarette filter made of cellulose (paper) has been introduced in the market, as it is an easily biodegradable compound, unlike cellulose acetate (plastic), which is a common component of conventional cigarette filters. The study concludes that, while conventional plastic filters take from 7.5 to 14 years to disappear in the compost and on the soil surface, respectively, cellulose filters take from 2.3 to 13 years. Paper-based filters are therefore an environmental solution for the slow degradation of cellulose acetate-based filters.

As described in patent CN102326865, cigarette filters are an indispensable part of cigarettes. In particular, filter materials have a significant influence on the quality of tobacco smoke and tar retention efficiency of cigarettes, paper filters being especially effective in this process. However, due to certain drawbacks associated with the ability thereof to deform during the suction process, the solution proposed in said patent is based on the use of polyester fibers as an additional component of the filter, the presence of which allows the hardness of the filter paper to be improved.

Patent U.S. Pat. No. 5,671,757 also describes the higher tar retention capacity of paper filters, compared with cellulose acetate filters. The invention proposed in said patent relates to an improved paper filter, based on the use of lyocell fibers.

Patent CN101243901 also relates to paper filters which, in addition to improving tar retention, comprise a fluorosurfactant, thus improving the retention capacity of phenolic compounds.

Patent application US2021378290 describes a paper filter comprising paper with a specific three-dimensional structure and polyethylene glycol, triethyl citrate or triacetin to increase the selective removal of semi-volatile compounds from tobacco smoke. The solution proposed in said application makes it possible to provide tobacco smoke with flavour features and sensory effects similar to those provided by conventional cellulose acetate filters.

Lastly, U.S. Ser. No. 11/083,217 describes the need for a filter paper that provides the same with properties similar to those of a cellulose acetate filter. This application also highlights the main advantages of paper filters over cellulose acetate filters, namely, the fact that they degrade more rapidly in the environment and that, in general, they are cheaper. However, as described in said patent, because paper filters have a higher retention capacity for tar, water and water vapour, they may lead to an undesirable change in the taste of cigarettes. Furthermore, as described in the patent, they have less resistance to smoke flowing through the cigarette and often the hardness (or resistance to mechanical deformation) thereof does not meet the expectations of a smoker who is used to a cellulose acetate filter.

Therefore, there is a need to solve the problem of a lack of hardness of paper filters, to achieve a filter pressure drop similar to, or slightly lower than that of filters made with cellulose acetate to compensate for the greater retention of smoke components by paper filters and to procure a minimal impact on the taste of the cigarette.

There are several difficulties involved in developing a new filter paper which are related, among others, to the following properties:

Ease of creping: In the manufacturing of filters, the paper is creped before the filter rod is manufactured, with the main objective of breaking the structure of the paper and improving the distribution of the paper fibers inside the rod. Paper texture, density and stiffness, are important properties for achieving good creping.

Air permeability: This is an indirect measurement of how far apart the fibers are. The higher the permeability, the more separated the fibers are and the greater the surface in contact with the cigarette smoke, increasing the filter pressure drop and, thus, the retention of smoke components. Air permeability is not in itself an absolute feature, as it is associated with grammage. In this sense, for example, a 20 $g/m^2$ paper with a permeability of 5000 CU will have fibers more associated than a 40 $g/m^2$ paper with the same permeability. Furthermore, since air permeability defines the structure of paper to a certain degree, it will have an effect on creping. For example, a low air permeability (below 1000 CU for a 36 $g/m^2$ paper) would make creping impossible, due to the high density and rigidity of the paper.

Tensile strength (elongation) and surface resistance: These features are important during the filter manufacturing process as they affect the machinability of the paper directly, meaning that they affect the performance thereof and the efficiency of the production process. This is so because suitable tensile strength and elongation features are essential to avoid paper breakage. Likewise, an ideal surface resistance will reduce the detachment of the paper fibers to acceptable levels, which will also improve the efficiency of the production process.

Grammage: for a specific width of the paper reel, the grammage of the paper directly affects the weight of the paper in the filters and, indirectly, the homogeneity of the distribution of the fibers inside the filter. A lower grammage increases this homogeneity, with a limit determined by the maximum width of the roll admitted by the filter machine and the required weight of the filters.

The developed filter paper allows the previous difficulties to be solved, offering an alternative solution to conventional cellulose acetate filters, with a minimal impact on the taste of cigarettes.

SUMMARY OF THE INVENTION

Therefore, a first object of the invention is a new filter paper, characterized in that it comprises:
a) between 70% and 100% by weight, preferably between 85% and 100%, and more preferably between 95% and 100% of cellulose fibers, wherein between 50% and 75% by weight, and more preferably between 65 and 70% by weight of the fibers, are long fibers (understanding for long fibers those having an average length greater than 2 mm) and between 25% and 50%, and more preferably between 30% and 35% by weight of the fibers, are short fibers (understanding for short fibers those having an average length of less than 2 mm); and b) between 0.1% and 5.0%, preferably between 0.2% and 4%, and more preferably between 0.4% and 1.0% by weight, of sodium carboxymethyl cellulose, which allows preventing the detachment of fibers during paper handling; and wherein:

c) the weight of the filter paper per unit area is between 25 and 55 g/m$^2$, and more preferably between 30 and 50 g/m$^2$, measured according to UNE-EN ISO 536:2013 standard;

d) the density of the filter paper (understanding for density as the weight per unit area in g/m$^2$ divided by the thickness in microns, measured according to UNE-EN ISO 534:2012 standard in a single sheet) varies between 0.100 and 0.500 g/cm$^3$, preferably between 0.150 and 0.350 g/cm$^3$, and more preferably between 0.200 and 0.300 g/cm$^3$; and e) the porosity of the filter paper is comprised between 1500 and 8500 ml/min·cm$^2$·kPa, preferably between 2000 and 7000 ml/min·cm$^2$·kPa, and more preferably between 4000 and 6000 ml/min·cm$^2$·kPa, measured according to UNE-EN ISO 2965:2019 standard.

For purposes of this patent, filter paper is understood as the paper contained inside the filter of a cigarette, the function of which is to act as a filtering material for cigarette smoke.

Another object of the invention is a filter characterized in that it comprises the previously described filter paper.

Particularly, said paper filter is characterized in that it has:

a diameter between 5 and 8 mm, preferably between 6 and 8 mm, and a length between 10 and 30 mm, preferably between 14 and 25 mm. Both the diameter and the length can be measured by any conventional cigarette dimensional metrology apparatus. The diameter, for example, can be measured by the Borgwaldt Size Tester S10 instrument, which is a standard in the tobacco industry. The length, in turn, can be measured with a measuring ruler;

a weight between 0.050 and 0.200 g, preferably between 0.090 and 0.110 g, and more preferably 0.102 g;

a hardness between 70% and 95%, preferably between 80% and 93%, and more preferably between 85% and 90%, measured according to any conventional cigarette hardness testing machine, such as the Borgwaldt Hardness Tester H10 instrument, which is a standard in the tobacco industry;

a pressure drop between 50 and 150 mm w·g. (0.490 and 1.471 kPa), preferably between 55 and 125 mm w·g. (0.539 and 1.226 kPa) and more preferably between 60 and 110 mm w·g. (0.588 and 1.079 kPa), measured according to any conventional machine for measuring the pressure drop in cigarettes, such as the Borgwaldt Draw Resistance Meter A11-2 instrument, according to UNE-EN ISO 6565: 2011 standard.

PREFERRED EMBODIMENT OF THE INVENTION

The values of the parameters that define the claimed paper filter corresponding to measurements of different samples of conventional filters (available on the market) are provided below, classified into cellulose acetate filters (table 1) and paper filters (table 2):

TABLE 1

Commercially available cellulose acetate filters

|  | Weight, g (15 mm) | Diameter, mm | Length, mm | Hardness, % | Pressure drop, mm w.g., 15 mm | Pressure drop, kPa |
| --- | --- | --- | --- | --- | --- | --- |
| 1 | 0.074 | 5.6 | 15 | 66.2 | 92.4 | 0.906 |
| 2 | 0.066 | 6.0 | 15 | 65.4 | 64.6 | 0.633 |
| 3 | 0.067 | 6.0 | 15 | 80.3 | 68.2 | 0.669 |
| 4 | 0.074 | 5.7 | 15 | 83.2 | 77.5 | 0.760 |
| 5 | 0.086 | 5.6 | 15 | 77.9 | 89.4 | 0.877 |
| 6 | 0.071 | 6.0 | 15 | 79.3 | 71.9 | 0.705 |
| 7 | 0.074 | 5.5 | 15 | 87.0 | 95.3 | 0.935 |
| 8 | 0.050 | 5.6 | 15 | 79.1 | 80.1 | 0.785 |
| 9 | 0.066 | 6.0 | 15 | 82.4 | 64.6 | 0.633 |
| 10 | 0.073 | 6.0 | 15 | 79.0 | 59.5 | 0.583 |
| 11 | 0.074 | 6.0 | 15 | 82.8 | 52.5 | 0.515 |
| 12 | 0.073 | 6.0 | 15 | 79.5 | 60.5 | 0.593 |
| 13 | 0.107 | 6.0 | 15 | 76.7 | 49.6 | 0.486 |
| 14 | 0.087 | 6.0 | 15 | 81.3 | 131.4 | 1.289 |
| 15 | 0.059 | 6.0 | 15 | 87.3 | 72.8 | 0.714 |
| 16 | 0.081 | 6.0 | 15 | 87.3 | 67.1 | 0.658 |
| Average | 0.074 | 5.9 | 15 | 79.7 | 74.8 | 0.733 |

TABLE 2

Commercially available paper filters

|  | Weight, g (15 mm) | Diameter, mm | Length, mm | Hardness, % | Pressure drop, mm w.g., 15 mm | Pressure drop, kPa |
| --- | --- | --- | --- | --- | --- | --- |
| 1 | 0.083 | 6.0 | 15 | 68.8 | 85.4 | 0.837 |
| 2 | 0.082 | 5.9 | 15 | 65.0 | 86.1 | 0.844 |
| 3 | 0.089 | 5.5 | 15 | 79.0 | 105.7 | 1.037 |
| 4 | 0.092 | 6.1 | 15 | 77.2 | 80.2 | 0.786 |
| 5 | 0.092 | 6.0 | 15 | 75.8 | 87.5 | 0.858 |

TABLE 2-continued

| | Commercially available paper filters | | | | | |
|---|---|---|---|---|---|---|
| | Weight, g (15 mm) | Diameter, mm | Length, mm | Hardness, % | Pressure drop, mm w.g., 15 mm | Pressure drop, kPa |
| 6 | 0.085 | 6.1 | 15 | 71.8 | 99.2 | 0.973 |
| 7 | 0.052 | 5.7 | 15 | 82.1 | 82.9 | 0.813 |
| 8 | 0.097 | 6.0 | 15 | 74.8 | 84.0 | 0.824 |
| 9 | 0.077 | 6.0 | 15 | 72.5 | 83.2 | 0.816 |
| 10 | 0.091 | 6.0 | 15 | 74.5 | 100.7 | 0.987 |
| 11 | 0.082 | 6.1 | 15 | 66.7 | 88.1 | 0.864 |
| 12 | 0.104 | 6.0 | 15 | 79.5 | 80.3 | 0.787 |
| Average | 0.086 | 5.9 | 15 | 74.0 | 88.6 | 0.869 |

The tables above show that, to achieve a similar hardness, although still inferior to the hardness of cellulose acetate filters, paper filters must have a higher pressure drop (approximately 18%). This fact, added to the greater retention of smoke components by the paper filter, has a negative impact on the taste of the cigarette.

The developed paper filter solves this problem since it provides a higher level of hardness than conventional paper filters, with a very slightly higher pressure drop than the one achieved when using cellulose acetate filters.

Below is a comparison of the results of the experimental tests carried out to demonstrate the properties of the claimed paper filter:

TABLE 3

| | Comparison of the results of commercial paper filter vs. claimed paper filter | | | | | | | |
|---|---|---|---|---|---|---|---|---|
| | Pressure drop mm w.g. n = 60 | | Hardness, % n = 60 | | Weight, g n = 6 | | Diameter, mm n = 60 | |
| | Average | CV | Average | CV | Average | CV | Average | CV |
| Claimed paper filter, 130 mm | 61 (0.598 kPa) | 7.5 | 89 | 3.0 | 0.103 | 0.3 | 5.98 | 0.6 |
| Commercial paper filter 1, 140 mm | 70 (0.686 kPa) | 8.9 | 78 | 4.2 | 0.084 | 0.7 | 5.92 | 2.2 |
| Commercial paper filter 2, 160 mm | 66 (0.647 kPa) | 10.3 | 80 | 6.6 | 0.074 | 2.4 | 5.92 | 1.2 |

The tests were carried out using paper filters 90 mm long with a diameter of 6 mm. The measured pressure drops and weights were adjusted to a 15 mm long rod.

In the tests carried out, it was shown that both commercial paper filter 1, and commercial paper filter 2, showed considerable fiber detachment, unlike the claimed paper filter which, due to its composition, showed greater structural stability.

The test was repeated with a sample of 60 cellulose acetate filter rods using the same machine. As in the case of the values found in table 3, in this case, the manufactured rods were also 90 mm long with a diameter of 6 mm. The measured pressure drops and weights were adjusted to a 15 mm long rod. The results were the following:

TABLE 4

| | Comparison of the results of commercial cellulose acetate filter vs. the claimed paper filter | | | | | | | |
|---|---|---|---|---|---|---|---|---|
| | Pressure drop mm w.g. n = 60 | | Hardness, % n = 60 | | Weight, g n = 6 | | Diameter, mm n = 60 | |
| | Average | CV | Average | CV | Average | CV | Average | CV |
| Claimed paper filter | 61 (0.598 kPa) | 7.5 | 89 | 3.0 | 0.103 | 0.3 | 5.98 | 0.6 |

TABLE 4-continued

Comparison of the results of commercial cellulose acetate filter vs. the claimed paper filter

| | Pressure drop mm w.g. n = 60 | | Hardness, % n = 60 | | Weight, g n = 6 | | Diameter, mm n = 60 | |
|---|---|---|---|---|---|---|---|---|
| | Average | CV | Average | CV | Average | CV | Average | CV |
| Commercial cellulose acetate paper filter | 59 (0.579 kPa) | 3.9 | 82 | 1.9 | 0.073 | 1.1 | 6.02 | 0.4 |

Table 3 shows the comparison between the filters produced with the claimed paper and those produced with commercial papers with two different widths. Table 4, in turn, shows the comparison of the results obtained with the same filter produced with the claimed paper shown in table 3 and a cellulose acetate filter produced in the same machine. As it can be observed, the level of hardness achieved is significantly higher than those of commercial paper filters and the cellulose acetate filter, with a pressure drop very slightly higher than that of the cellulose acetate filter.

The invention claimed is:

1. A filter paper comprising:
   a) between 70% and 100% by weight of cellulose fibers, wherein between 50% and 75% by weight of the fibers are long fibers, understanding by long fibers those having an average length greater than 2 mm, and wherein between 25% and 50% by weight of the fibers are short fibers, understanding by short fibers those having an average length of less than 2 mm; and
   b) between 0.1% and 5.0% by weight of sodium carboxymethyl cellulose, and wherein:
   c) the weight of the filter paper per unit area is between 25 and 55 g/m$^2$, measured according to UNE-EN ISO 536:2013 standard;
   d) the density of the filter paper, measured according to UNE-EN ISO 534:2012 standard in a single sheet, varies between 0.100 and 0.500 g/cm$^3$; and
   e) the porosity filter paper is comprised between 1500 and 8500 ml/min·cm$^2$·kPa, measured according to UNE-EN ISO 2965:2019 standard.

2. A paper filter comprising the filter paper according to claim 1.

3. The paper filter according to claim 2, wherein said paper filter has:
   a) a diameter between 5 and 8 mm;
   b) a weight between 0.050 and 0.200 g measured according to UNE-EN ISO 536:2013 standard;
   c) a hardness between 70% and 95%;
   d) a pressure drop between 0.490 and 1.471 kPa, measured according to UNE-EN ISO 6565: 2011 standard.

* * * * *